(12) United States Patent
Mochizuki et al.

(10) Patent No.: US 10,166,892 B2
(45) Date of Patent: Jan. 1, 2019

(54) PAD

(71) Applicant: TOYOTA BOSHOKU KABUSHIKI KAISHA, Aichi-ken (JP)

(72) Inventors: Hayato Mochizuki, Aichi-ken (JP); Tadayoshi Umemura, Aichi-ken (JP); Hidekazu Taketani, Aichi-ken (JP); Motonari Sadohira, Aichi-ken (JP); Masashi Takagi, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 50 days.

(21) Appl. No.: 15/333,829

(22) Filed: Oct. 25, 2016

(65) Prior Publication Data

US 2017/0113587 A1  Apr. 27, 2017

(30) Foreign Application Priority Data

Oct. 27, 2015  (JP) ................. 2015-210859

(51) Int. Cl.
  *B60N 2/70* (2006.01)
  *B60N 2/64* (2006.01)
  *A47C 27/14* (2006.01)

(52) U.S. Cl.
  CPC ........... *B60N 2/64* (2013.01); *B60N 2/70* (2013.01); *B60N 2/7017* (2013.01); *A47C 27/148* (2013.01)

(58) Field of Classification Search
  CPC ................. B60N 2/70; A47C 27/148
  USPC ......... 297/452.27, 452.28, 452.34–452.37, 297/452.48, 452.22, 452.23
  See application file for complete search history.

(56) References Cited

U.S. PATENT DOCUMENTS

| | | | | |
|---|---|---|---|---|
| 5,189,747 A | * | 3/1993 | Mundy | A61G 5/1043 24/30.5 S |
| 5,630,240 A | * | 5/1997 | Matsuoka | A47C 7/18 297/452.25 |
| 5,944,389 A | * | 8/1999 | Zenba | B60N 2/70 156/78 |

(Continued)

FOREIGN PATENT DOCUMENTS

| | | |
|---|---|---|
| CN | 101933730 | 1/2011 |
| CN | 102602316 | 7/2012 |

(Continued)

OTHER PUBLICATIONS

Office Action issued in China Counterpart Patent Appl. No. 201610957908.0, dated Aug. 2, 2018, along with an English translation thereof.

*Primary Examiner* — Syed A Islam
(74) *Attorney, Agent, or Firm* — Greenblum & Bernstein, P.L.C.

(57) ABSTRACT

A pad includes: a first pad which is elastically bendable and deformable by pressure, the first pad including a pressed portion on which a pressing force is applied; and a second pad which is harder to bend compared to the first pad, wherein the first pad and the second pad are integrally formed, wherein the pressed portion is disposed to be adjacent to the second pad in a direction orthogonal to a pressing direction of the pressing force, and wherein at least one pad of the first pad and the second pad includes a facilitating part which facilitates the pressed portion to be bent and deformed with respect to the second pad, and the facilitating part is formed of the one pad itself.

10 Claims, 9 Drawing Sheets

(56) References Cited

U.S. PATENT DOCUMENTS

| | | | | |
|---|---|---|---|---|
| 6,457,777 | B1* | 10/2002 | Kazuno | A47C 7/18 297/452.48 |
| 8,360,530 | B2* | 1/2013 | Onoda | B60N 2/646 297/452.21 |
| 2004/0012238 | A1* | 1/2004 | Zenba | B60N 2/70 297/452.27 |
| 2010/0133891 | A1 | 6/2010 | Onoda et al. | |
| 2010/0187791 | A1* | 7/2010 | Izinger | A47C 7/18 280/250.1 |
| 2011/0089742 | A1* | 4/2011 | Takahashi | B60H 3/00 297/452.48 |
| 2012/0187739 | A1 | 7/2012 | Folkert et al. | |
| 2013/0200661 | A1* | 8/2013 | Klusmeier | B29C 70/088 297/180.12 |
| 2013/0313885 | A1* | 11/2013 | Nishiyama | B60N 2/90 297/452.21 |
| 2014/0077550 | A1 | 3/2014 | Makiguchi et al. | |
| 2016/0039322 | A1* | 2/2016 | Nakada | B60N 2/646 297/452.48 |
| 2016/0052435 | A1* | 2/2016 | Nakada | B60N 2/646 297/452.48 |

FOREIGN PATENT DOCUMENTS

| | | | |
|---|---|---|---|
| DE | 3544094 A1 * | 6/1987 | A47C 7/46 |
| DE | 102005002438 | 7/2006 | |
| JP | 2010-125138 | 6/2010 | |

\* cited by examiner

PAD

CROSS-REFERENCE TO RELATED APPLICATION

This application claims priorities from Japanese Patent Application No. 2015-210859 filed on Oct. 27, 2015, the entire subject matters of which is incorporated herein by reference.

TECHNICAL FIELD

The present invention relates to a pad integrally including a first pad which is elastically bendable and deformable by a pressure and a second pad which is harder to bend compared to the first pad.

BACKGROUND

As a type of pad, there is known a seat pad used for a seat cushion of a vehicle seat (see JP-A-2010-125138). The seat pad is a member which forms an outer shape of a seat and elastically supports an occupant, and includes a surface layer pad corresponding to the first pad of the present disclosure and a back layer pad corresponding to the second pad of the present disclosure. The surface layer pad is a pad disposed on the seating side of the seat, and is formed, for example, of a polyurethane foam. A seating surface portion, which has a shape of occupying the entire seating surface of the seat, and a bulge portion, which protrudes from the seating surface portion to the back surface of the seat, are provided in the surface layer pad. The bulge portion is provided in a substantially central portion of the seating surface portion in a front and rear direction of the seat, and is disposed, for example, in such a position that the buttocks of the occupant can be supported. The back layer pad is a pad which is disposed on the back of the seat and supports the surface layer pad from below, and is formed of a material such as AS resin (styrene acrylonitrile resin) which is harder than the surface layer pad to be harder to bend. A hole which passes through the back layer pad in a thickness direction is provided in the back layer pad, and the bulge portion of the surface layer pad is disposed in the hole in a fitted state.

In the known art, the surface layer pad made of polyurethane foam can be molded by foaming a molding material in a mold cavity. At this time, the back layer pad made of AS resin is disposed in advance at a proper position inside the cavity so that the surface layer pad can be integrated with the back layer pad simultaneously with the molding. The bulge portion of the surface layer pad is molded to be in the state of being fitted in a hole of the back layer pad. At this time, when viewed from the back surface of the seat, the front and rear and right and left circumferential edges of the bulge portion are integrated with the inner surface side of the hole of the back layer pad. In this manner, the surface layer pad is supported by the back layer pad from below, and is covered with a seat cover. When the occupant is seated, the surface layer pad is pressed downward from the upper side to be appropriately bent and deformed. At this time, the bulge portion of the surface layer pad is strongly pressed by the buttocks of the occupant to be largely bent and deformed into the hole of the back layer pad.

In the known art, when viewed from the back surface of the seat, the front and rear and right and left circumferential edges of the bulge portion are integrated with the inner surface side of the hole of the back layer pad. That is, in the longitudinal and lateral directions orthogonal to a pressing direction, the bulge portion is integrated with the back layer pad, which is stiff so that it is harder to bend and deform, in an adjacent state. For this reason, in the known art, when the occupant is seated, and the bulge portion is largely bent and deformed, the portion which is integrated with the back layer pad cannot sufficiently follow the bending and deformation and prevents not to deform. The bulge portion is bent and deformed less than expected. Thus, for example, seating performance deteriorates, and an amount in which the occupant sinks into the seat cushion is decreased. Therefore, there is a concern that the hip point of the occupant is higher than a designed value.

SUMMARY

The present disclosure is made in consideration of the above-mentioned circumstances, and one of objects of the present disclosure is to provide a pad that includes a first pad, which is relatively easy to bend and deform, and a second pad, which does not considerably inhibit the bending and deformation and is relatively harder to bend.

According to an illustrative embodiment of the present disclosure, there is provided a pad including: a first pad which is elastically bendable and deformable by pressure, the first pad including a pressed portion on which a pressing force is applied; and a second pad which is harder to bend compared to the first pad, wherein the first pad and the second pad are integrally formed, wherein the pressed portion is disposed to be adjacent to the second pad in a direction orthogonal to a pressing direction of the pressing force, and wherein at least one pad of the first pad and the second pad includes a facilitating part which facilitates the pressed portion to be bent and deformed with respect to the second pad, and the facilitating part is formed of the one pad itself.

DETAILED DESCRIPTION

Figure 1:
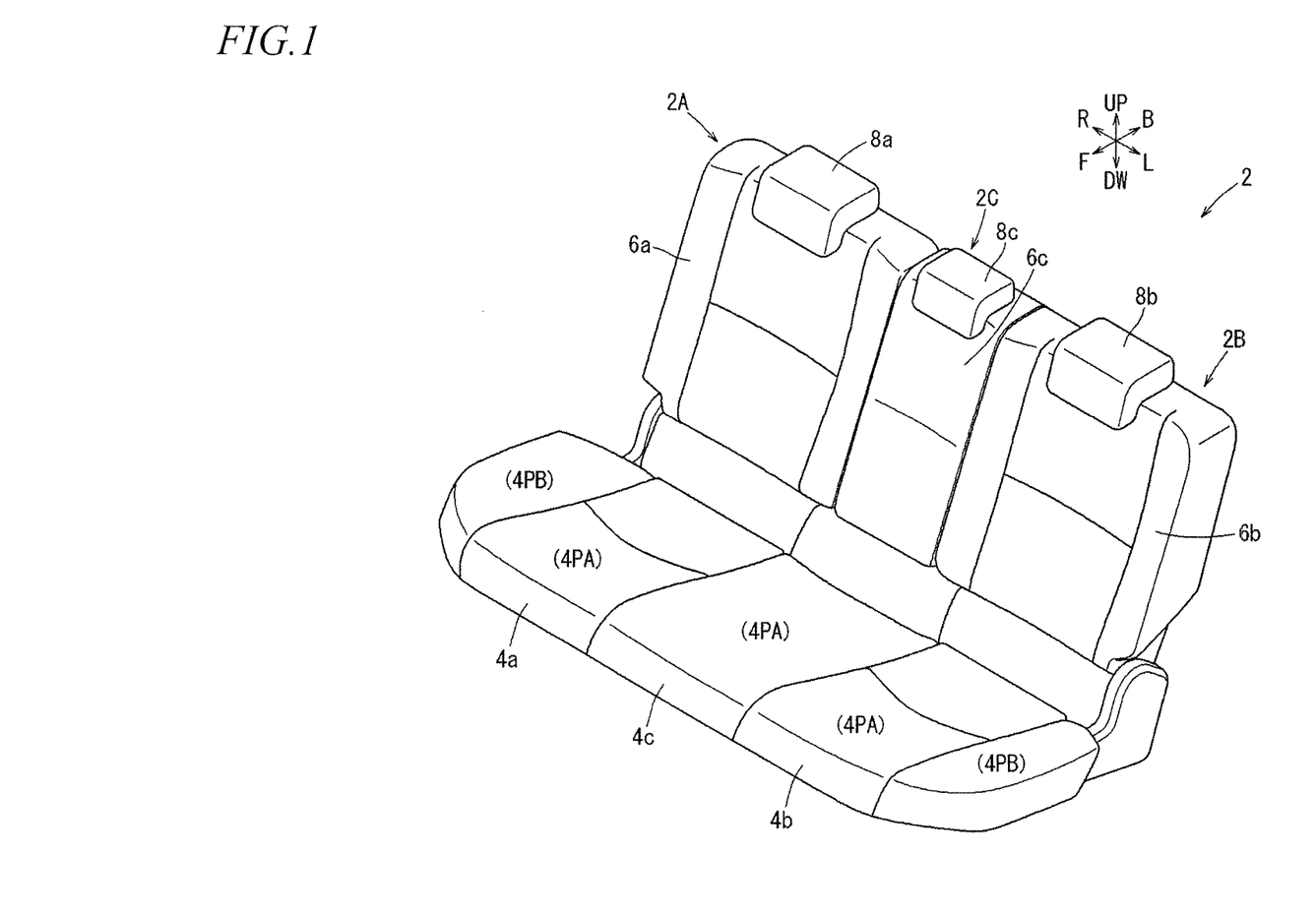
FIG. 1 is a perspective view illustrating a vehicle seat.

Hereinafter, an embodiment of the present disclosure will be described with reference to FIGS. 1 to 9. In the drawings, appropriately, a front side of a vehicle seat is indicated by reference numeral F, a rear side of the vehicle seat is indicated by reference numeral B, an upper side of the vehicle seat is indicated by reference numeral UP, a lower side of the vehicle seat is indicated by reference numeral DW, a right side of the vehicle seat is indicated by reference numeral R, and a left side of the vehicle seat is indicated by reference numeral L. A vehicle seat 2 of FIG. 1 is a laterally long seat on which a plurality of occupants can be seated, and includes a first seat portion 2A, a second seat portion 2B, and an intermediate seat portion 2C connecting the first seat portion and second seat portion. The first seat portion 2A is disposed on the right side of the seat, and includes a seat cushion 4a, a seat back 6a, and a headrest 8a. The second seat portion 2B is disposed on the left side of the seat, and includes a seat cushion 4b, a seat back 6b, and a headrest 8b which are disposed symmetrically with the first seat portion 2A in a shape substantially the same as the first seat portion 2A. The intermediate seat portion 2C is disposed in the center of the seat, and includes a seat cushion 4c, a seat back 6c, and a headrest 8c which are slightly narrower than the first seat portion 2A.

Figure 2:
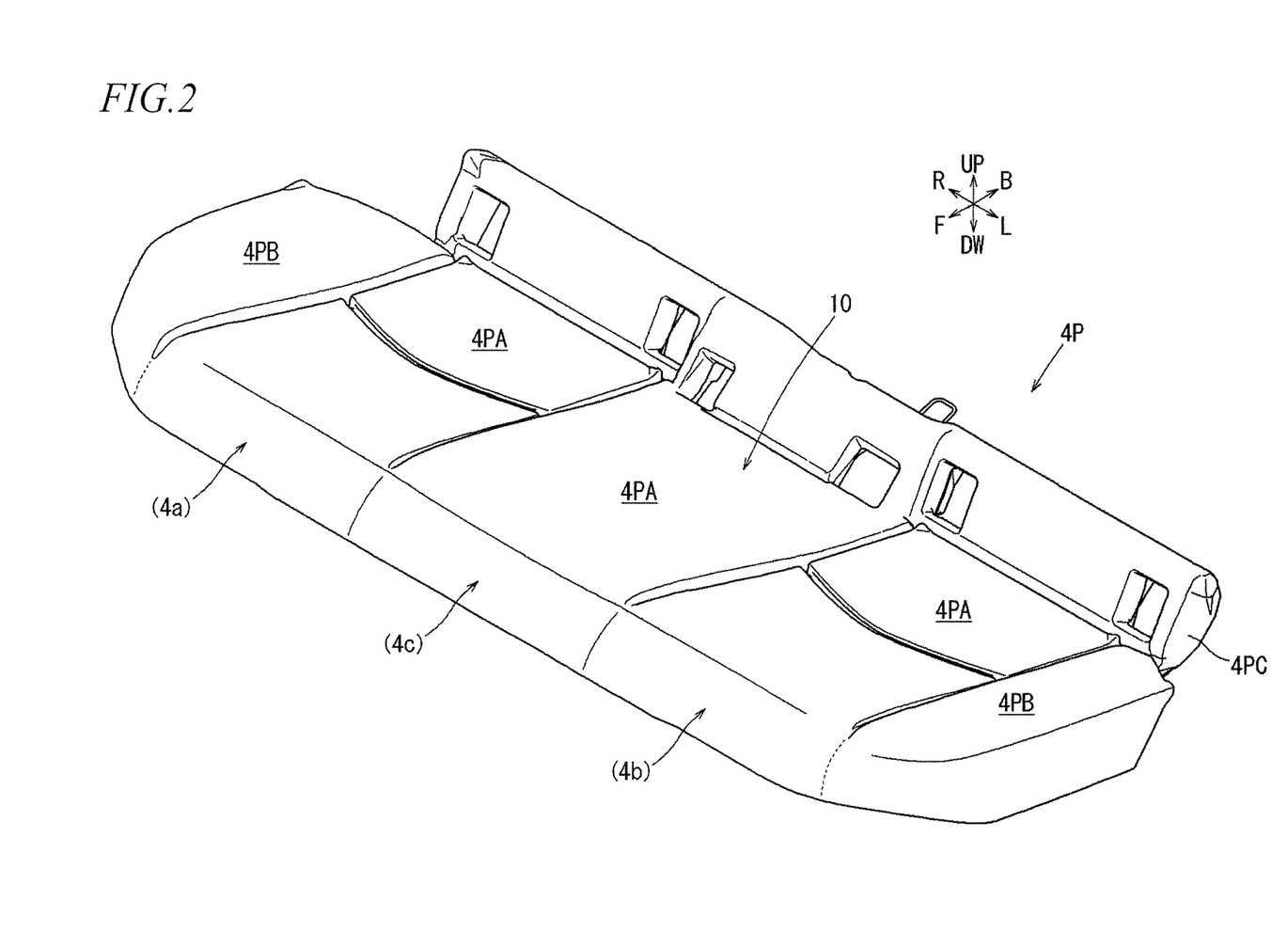
FIG. 2 is a perspective view illustrating a seat pad.
Figure 6:
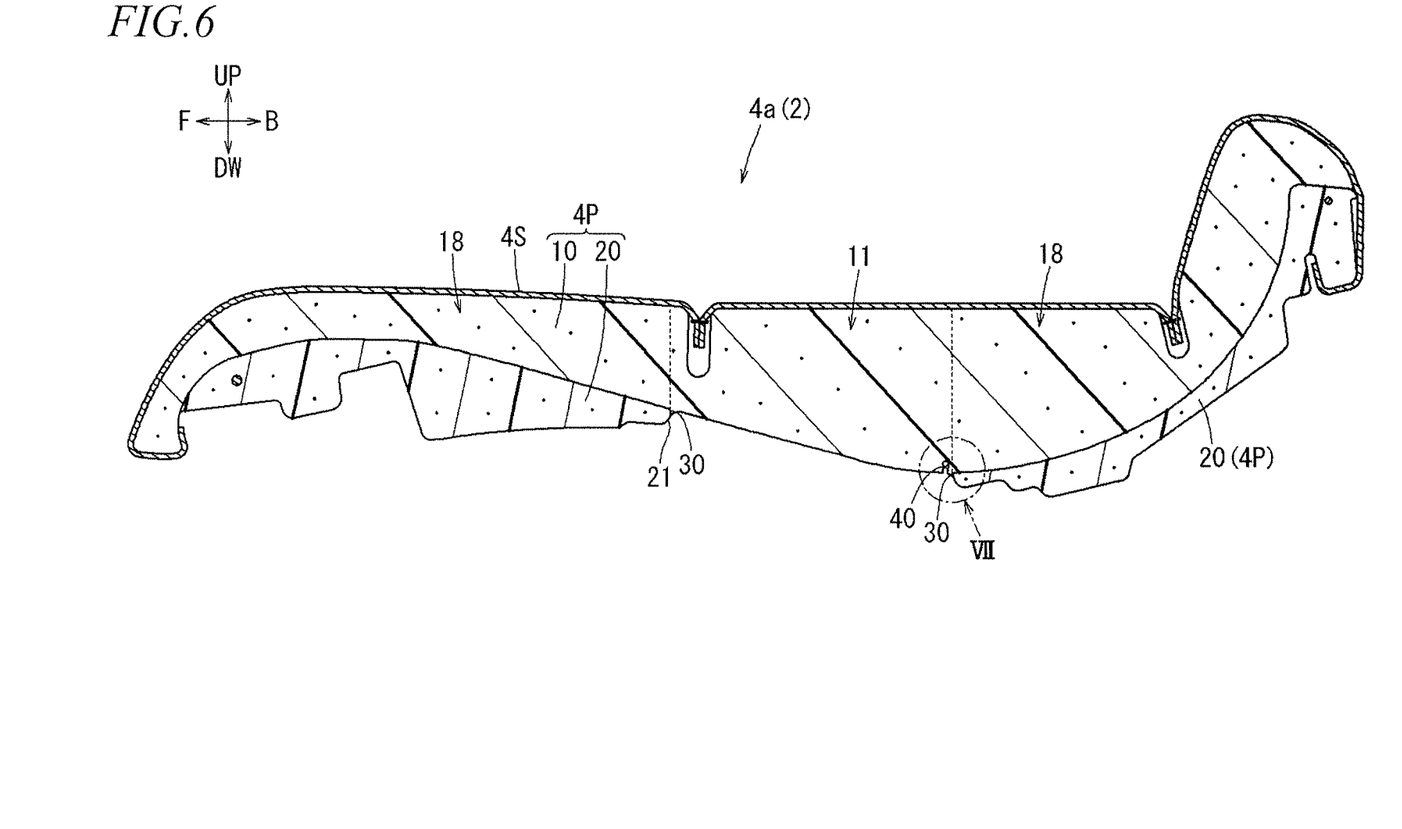
FIG. 6 is a sectional view illustrating the seat pad taken along line VI-VI of FIG. 5.
Figure 7:
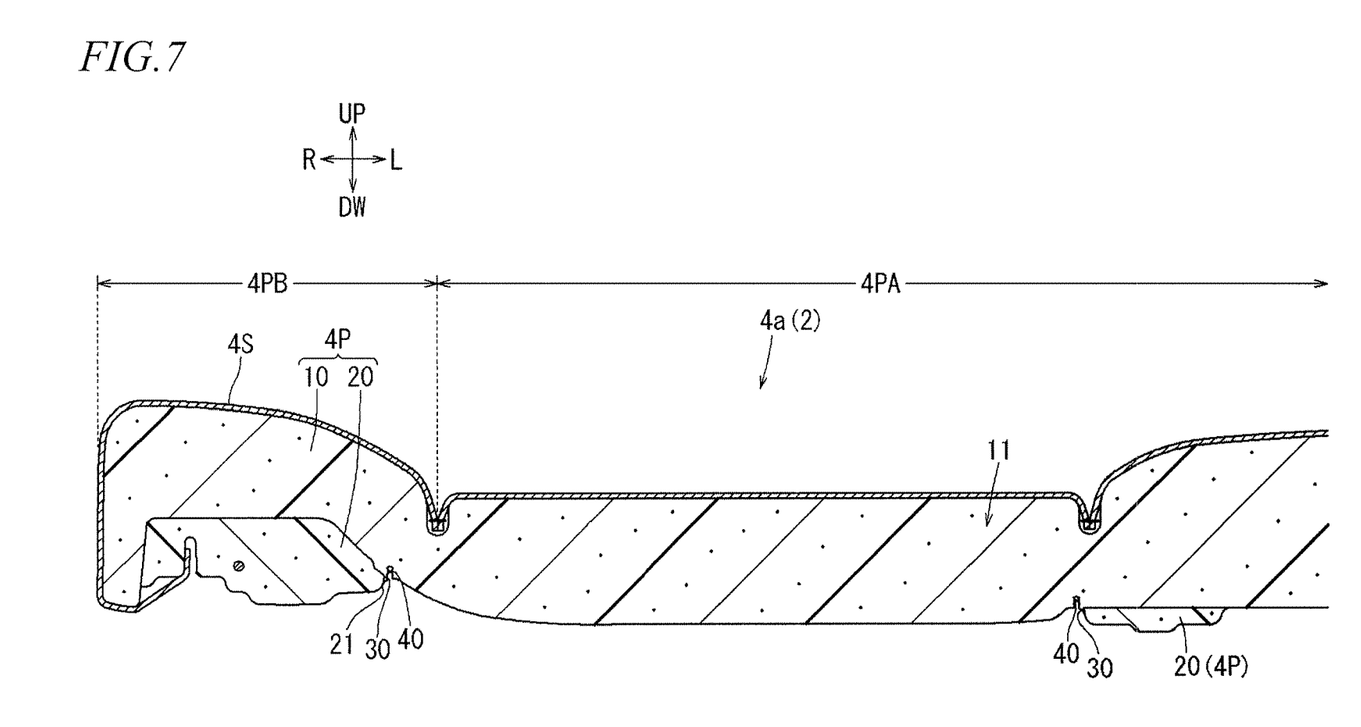
FIG. 7 is a sectional view illustrating the seat pad taken along line VII-VII of FIG. 5.

In this embodiment, each of the seat cushions 4a to 4c has a seat pad 4P (to be described in detail below) which is illustrated in FIG. 2 and corresponds to a pad of the present disclosure. The seat pad 4P is disposed on a seat frame (not illustrated) serving as a seat framework, and is covered with the seat cover 4S as illustrated in FIG. 6. The seat frame is a frame-shaped or panel-shaped member serving as a seat framework, and can be formed of a material such as a metal or resin which has high strength. The seat cover 4S is a surface material with which the seating side of the seat pad 4P can be covered, and can be formed, for example, of cloth (woven fabric, knitted fabric, and non-woven fabric) or leather (natural leather and synthetic leather). With reference to FIGS. 6 and 7, the end of the seat cover 4S is engaged to the back surface of a second pad 20 (to be illustrated).

With reference to FIG. 2, the seat pad 4P is a member which can elastically support the occupant and has a substantially rectangular shape in top view, and forms the entire outer shape of the seat cushions 4a to 4c. The seating surface of the seat pad 4P can be divided into a seating part 4PA in a substantially central portion in a seat width direction, and bank parts 4PB in the right and left ends. The seating part 4PA is a part which is formed over the seat cushions 4a to 4c and has a substantially flat shape, and a part where the occupant is seated, for example, during normal driving. The occupant may be a passenger or a driver. The bank parts 4PB are provided in the right end of the first seat portion 2A and the left end of the second seat portion 2B, respectively. Each of the right and left bank parts 4PB is a part which protrudes upward from the seating part 4PA, and can support the side portion of the occupant, for example, when the vehicle is traveling around a curve.

Figure 3:
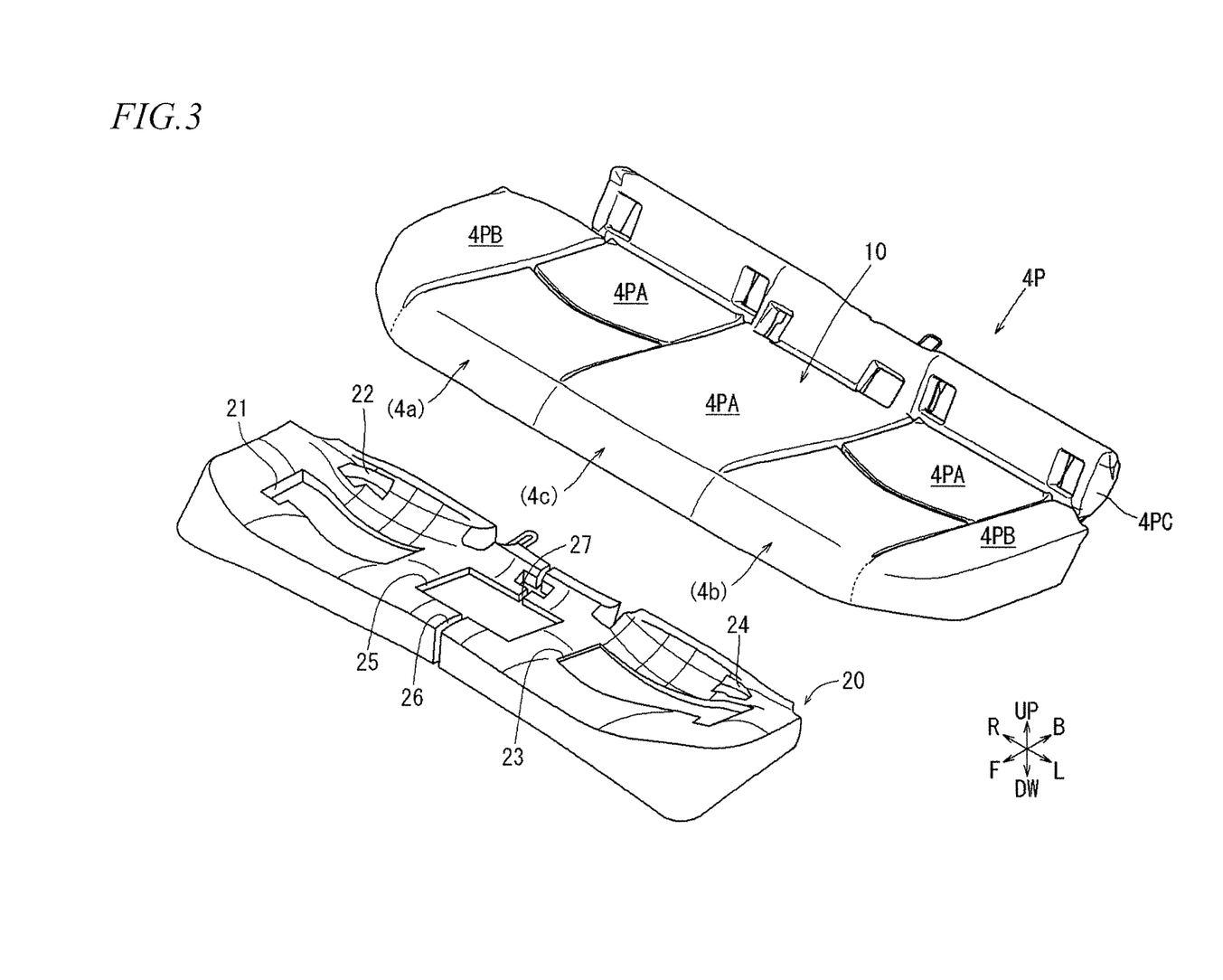
FIG. 3 is an exploded perspective view illustrating the seat pad.
Figure 4:
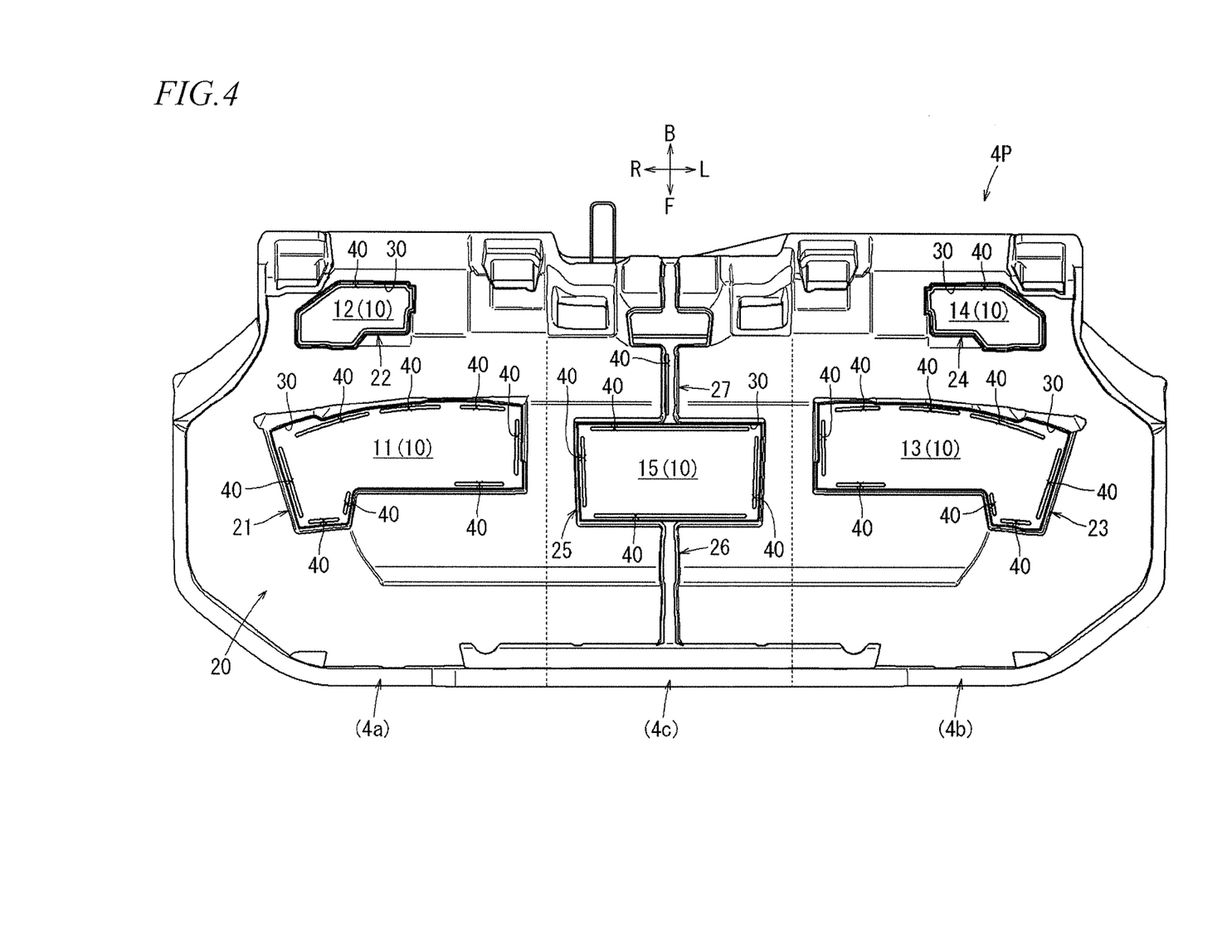
FIG. 4 is a view illustrating a back surface of the seat pad.

The seat pad 4P is an integrally molded article formed by two types of the pads. With reference to FIGS. 3 to 7, the seat pad 4P integrally includes a first pad 10 which is relatively easy to bend and deform, and the second pad 20 which is relatively hard to bend (each pad will be described in detail below). The first pad 10 is provided on the seating side of the seat and is disposed to elastically support the occupant, and includes a plurality of pressed portions 11 to 15 (to be described). The second pad 20 is provided on the back surface of the seat and is disposed to support the first pad 10 from below. In this embodiment, in order to improve seating performance of the seat, the first pad 10 elastically supports the occupant in the state of being supported by the second pad 20 from below. However, at this time, the plurality of pressed portions 11 to 15 (to be described in detail below) are relatively strongly pressed by the occupant to be largely bent and deformed downward. With reference to FIG. 4, the pressed portions 11 to 15 are disposed to be exposed from the second pad 20 when viewed from the back surface of the seat. The circumferential edges of the pressed portions 11 to 15 are integrated with the second pad 20. With such a configuration, the bending and deformation of the pressed portions 11 to 15 can be avoided because it is inhibited by the second pad 20 which is relatively hard to bend.

In this regard, in this embodiment, a configuration (facilitating part 40) which will be described below integrates the first pad 10, which is relatively easy to bend and deform, with the second pad 20 which does not considerably inhibit the bending and deformation of the first pad 10 and is relatively hard to bend. Each configuration will be described in detail below. In this embodiment, a vertical direction of the seat is a direction of pressing the pressed portions 11 to 15. The front and rear direction of the seat and the right and left direction of the seat are orthogonal to the direction of pressing the pressed portion. The back surface of the seat is a surface orthogonal to the pressing direction.

The first pad 10 is a member having a substantially rectangular shape in top view. With reference to FIG. 4, the first pad 10 includes the plurality of pressed portions 11 to 15 (integrating part 30 and facilitating part 40) to be described below. The first pad 10 may be formed of a material which can be elastically bent and deformed by the pressure, and foam resin such as polyurethane foam (density: 10 kg/m3 to 60 kg/m3) can be exemplified. With reference to FIGS. 2 and 3, the upper surface of the first pad 10 forms a shape of the seating surface of the seating part 4PA and the bank part 4PB. A protruding portion 4PC which protrudes upward is provided in the rear portion of the first pad 10. With reference to FIGS. 6 and 7, the thickness dimension of the back surface of the first pad 10 in the seating part 4PA is larger on the central side than the end.

With reference to FIG. 3, the second pad 20 is a member which is slightly smaller than the first pad 10 and has a substantially rectangular shape. With reference to FIG. 4, the second pad 20 has a plurality of insertion holes (first insertion hole 21 to fifth insertion hole 25). The second pad 20 is hard to bend compared to the first pad 10, and preferably has such hardness that the first pad 10 can be supported from below. A type of material of the second pad 20 can be exemplified by expanded polypropylene (EPP) resin or styrene-acrylonitrile copolymer (AS) resin which is hard to elastically bend compared to polyurethane foam. The second pad 20 can be exemplified by a member which is reinforced such that a wire material is buried in foam resin such as polyurethane foam, and thus it is hard to bend structurally. With reference to FIGS. 6 and 7, the upper surface of the second pad 20 has a concave shape which is curved downward such that the first pad 10 can be stably supported from the back surface. A thickness dimension of the second pad 20 is smaller on the central side than the end. Each of the first insertion hole 21 to the fifth insertion hole 25 is a hole portion which passes through the second pad 20 in a thickness direction, and is disposed in a position where any one of the pressed portions 11 to 15 (to be described below) can be fitted. With reference to FIG. 4, in this embodiment, the insertion holes 21, 23, and 25 are provided in the vicinity of the rear portions of the seating parts 4PA of the seat cushions 4a to 4c, respectively. The insertion holes 22 and 24 are provided in the vicinity of the rear ends of the seating parts 4PA of the seat cushions 4a and 4b, respectively.

With reference to FIG. 4, the first pad 10 in this embodiment includes the plurality of pressed portions 11 to 15. With reference to FIG. 6, a normal portion 18 of the first pad 10 except the pressed portions 11 to 15 is disposed in the state of being supported by the second pad 20 from below. The normal portion 18 is adjacent to the second pad 20 when viewed in a vertical direction of being pressed, and the lower surface side of the normal portion 18 is integrated with the second pad 20. With reference to FIG. 4, the pressed portions 11 to 15 are not supported by the second pad 20 from below, and are fitted to the corresponding insertion holes 21 to 25 to be exposed from the back surface of the second pad 20. That is, the pressed portions 11 to 15 are disposed to be adjacent to the second pad 20 only in the longitudinal and lateral directions orthogonal to the pressing direction. Most of the bank part 4PB of the first pad 10 is formed as the normal portion (reference numeral is not illustrated), but a plurality of pressed portions or single pressed portion may be provided in a proper position.

Figure 5:
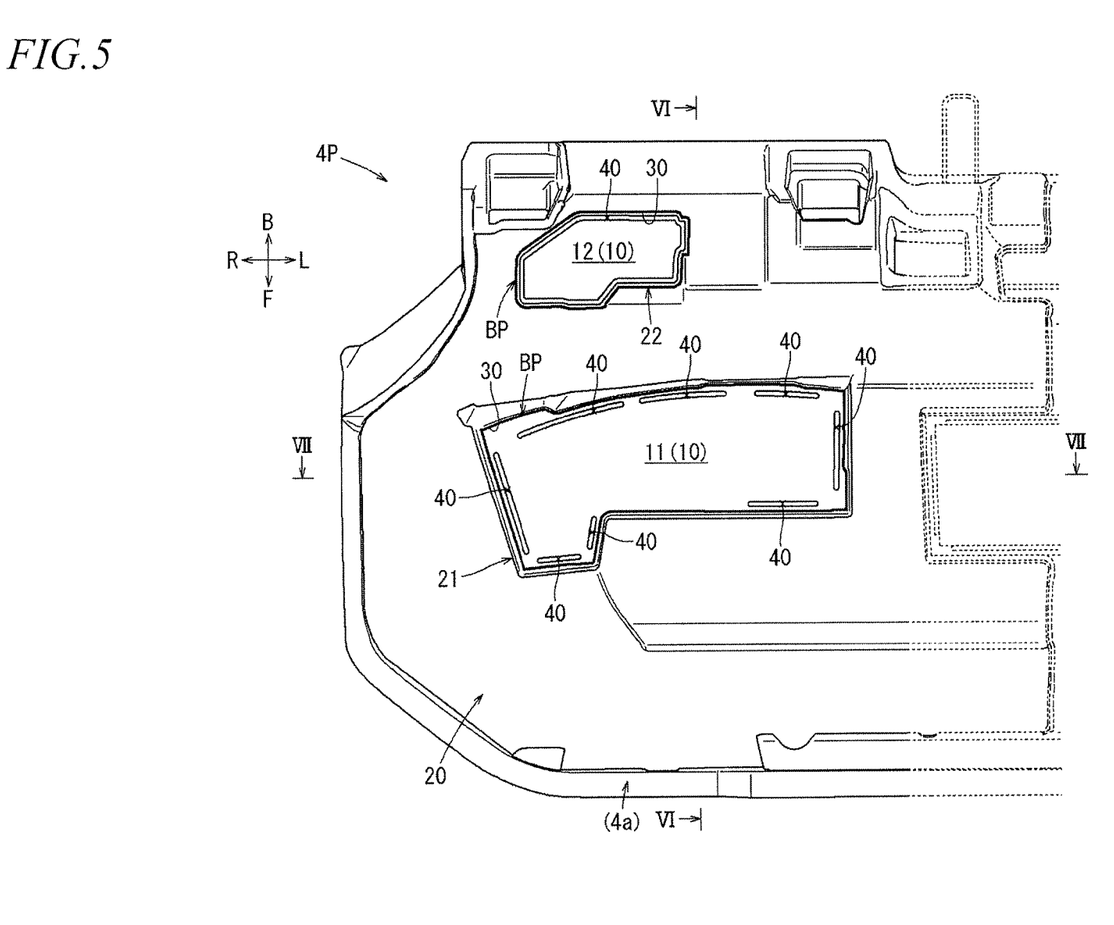
FIG. 5 is a partially enlarged view illustrating the back surface of the seat pad.

With reference to FIG. 5, in this embodiment, the first pressed portion 11 is provided in the vicinity of the center of the rear portion of the seating part 4PA of the seat cushion 4a and is disposed in such a position that the first pressed portion 11 can face the buttocks of the occupant from below under normal conditions. With reference to FIG. 7, the right end of the first pressed portion 11 is disposed to slightly protrude to the bank part 4PB. The first pressed portion 11 is disposed to the first insertion hole 21 in a fitted shape, and includes the integrating part 30 and the plurality of facilitating parts 40 which are described below. The first pressed portion 11 has a substantially rectangular and long shape in a seat width direction when viewed from the back surface of the seat, and has such an area that the buttocks of the occupant can be contained when the occupant is seated. The first pressed portion 11 is in the state of being disposed to be adjacent to the second pad 20 in the front and rear and right and left circumference.

With reference to FIG. 5, the second pressed portion 12 is provided on the right side of the rear end of the seating part 4PA of the seat cushion 4a, and is disposed in such a position that the second pressed portion 12 can face the rear side of the buttocks of the occupant under normal conditions. The second pressed portion 12 is also disposed in a second insertion hole 22 in a fitted shape, and includes the integrating part 30 and the facilitating part 40 which will be described below. The second pressed portion 12 has a substantially rectangular shape which is narrower than the first pressed portion 11, and has such an area that at least a portion of the buttocks of the occupant can be supported by the inclined rear side. The second pressed portion 12 also is in the state of being disposed to be adjacent to the second pad 20 in the circumference when viewed from the back surface of the seat.

With reference to FIG. 4, the third pressed portion 13 is provided in the center of the rear portion of the seating part 4PA of the seat cushion 4b, and is disposed in the third insertion hole 23 in a fitted state. The fourth pressed portion 14 is provided on the left side of the rear end of the seating part 4PA of the seat cushion 4b, and is disposed in the fourth insertion hole 24 in the fitted state. The pressed portions 13 and 14 of the seat cushion 4b have substantially the same basic configuration as the above-described pressed portions 11 and 12 of the seat cushion 4a, respectively. The first pressed portion 11 and the third pressed portion 13 are disposed to be bilaterally symmetrical, and the second pressed portion 12 and the fourth pressed portion 14 are disposed to be bilaterally symmetrical. The fifth pressed portion 15 is provided in the center of the rear portion of the seating part 4PA of the seat cushion 4c. The fifth pressed portion 15 has substantially the same basic configuration as the first pressed portion 11 except that the fifth pressed portion 15 communicates with cutout groove parts 26 and 27 of the second pad 20 which extend in the center in the front and rear direction when viewed in a seat width direction.

Figure 8:
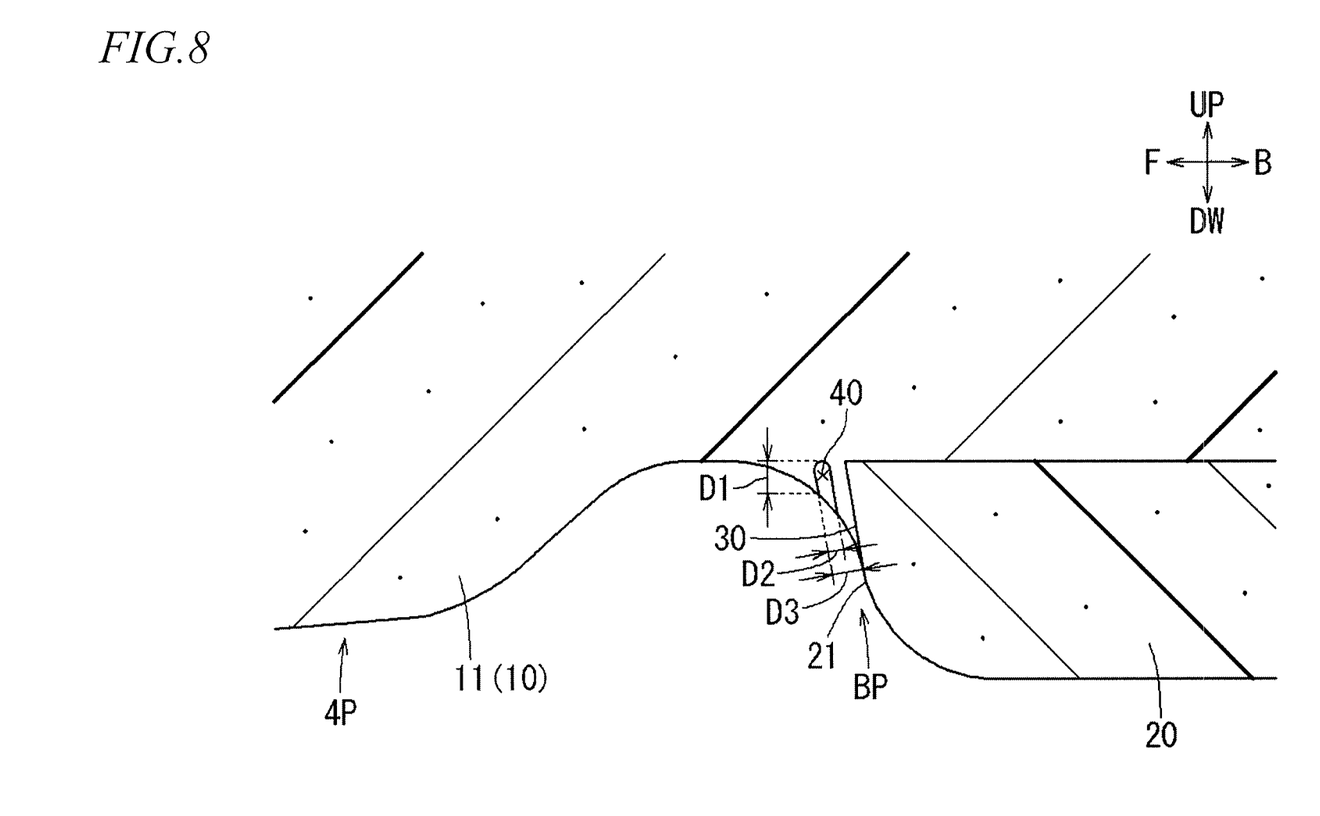
FIG. 8 is a partially enlarged sectional view illustrating the seat pad.
Figure 9:
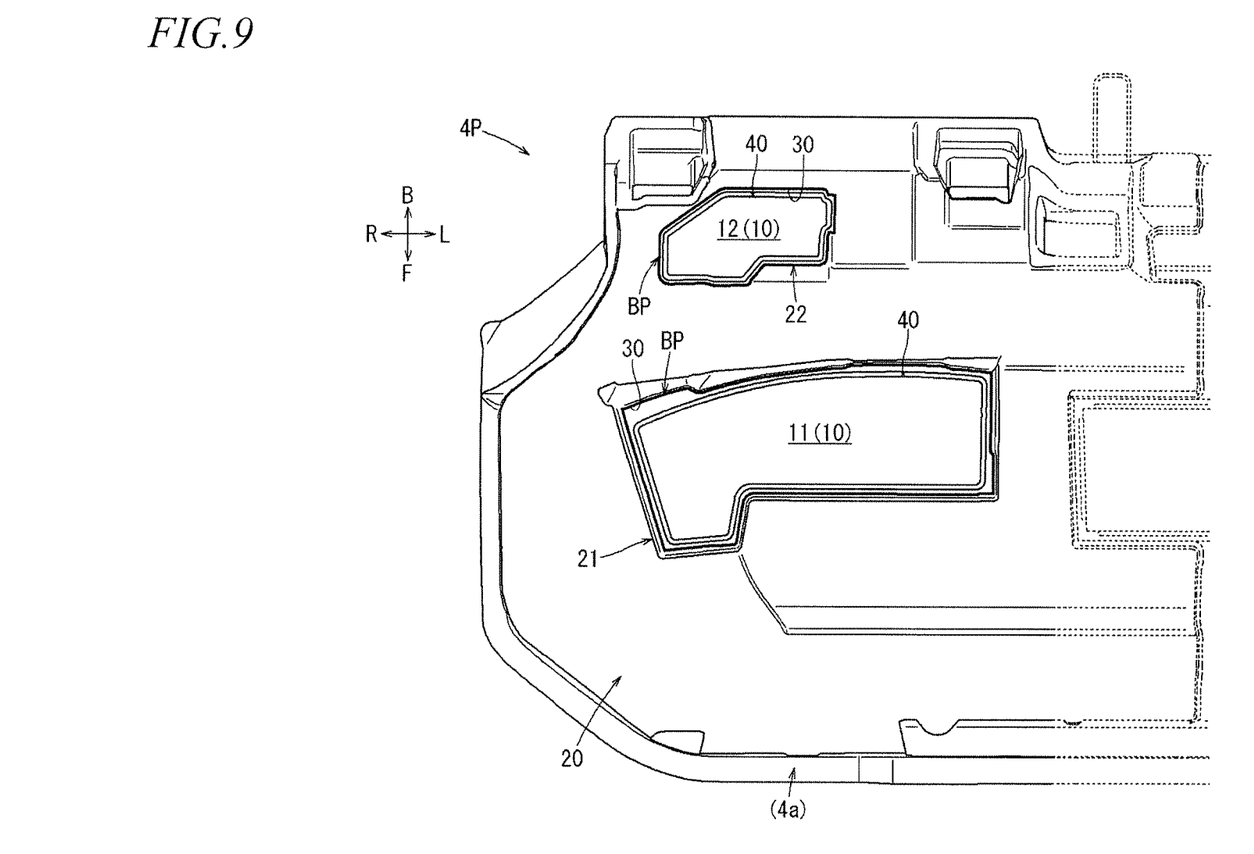
FIG. 9 is a partially enlarged view illustrating a back surface of a seat pad according to a first modification.

With reference to FIGS. 4, 5, and 8, the integrating part 30 is a part which is integrated with the adjacent second pad 20. The integrating part 30 is provided in a boundary BP with the second pad 20 when viewed in the longitudinal and lateral directions orthogonal to the pressing direction. In this embodiment, the integrating part 30 is provided along the outer surface of each of the pressed portions 11 to 15 when viewed from the back surface of the seat, and the pressed portions 11 to 15 are integrally fixed to the inner surfaces of the corresponding insertion holes 21 to 25 by the integrating part 30. The forming method of the integrating part 30 is not particularly limited, and in this embodiment, when the first pad 10 (to be described below) is molded, the integrating part 30 is formed in such a manner that the molding material to be the pressed portion is cured while foaming, and is fixed to the second pad 20. The pressed portions 11 to 15 can be stably disposed by being appropriately integrated with the second pad 20 by the integrating part 30.

With reference to FIG. 4, the facilitating part 40 is a portion which facilitates the pressed portions 11 to 15 to be bent and deformed to the second pad 20, and can be formed by the pressed portions 11 to 15 themselves. The facilitating part 40 of this embodiment is a groove-shaped portion which is concave in the thickness direction of the pressed portions 11 to 15, and is configured by setting the shape of the pressed portions 11 to 15 themselves to be concave. With reference to FIG. 8, the groove-shaped facilitating part 40 is provided in the vicinity of the boundary PB on the inner side of the integrating part 30, and the part of the pressed portion (first pressed portion 11 in FIG. 8) disposed on the inner side of the facilitating part 40 is disposed away from the adjacent second pad 20 and integrating part 30. A depth dimension D1 of the groove-shaped facilitating part 40 is not particularly limited as long as the bending and deformation of the pressed portions 11 to 15 can be facilitated. A width dimension D2 of the facilitating part 40 and a distance dimension D3 of the facilitating part 40 from the boundary BP also are not particularly limited as long as the bending and deformation of the pressed portions 11 to 15 can be facilitated.

The facilitating part 40 can be disposed along at least a part of the boundary BP between each of the pressed portions 11 to 15 and the second pad 20. With reference to FIG. 5, for example, the facilitating part 40 which has a slightly short linear shape is intermittently provided in the front side, the rear side, and both right and left sides of the first pressed portion 11 of the seat cushion 4a when viewed from the back surface of the seat. The more facilitating parts 40 of the first pressed portion 11 are provided on the rear side which is close to the center of gravity of the buttocks of the occupant compared with the front side. The plurality of facilitating parts 40 can be disposed substantially equally in the rear side and both right and left sides of the first pressed portion 11 without extreme deviation. The facilitating part 40 which has a substantially rectangular shape is continuously formed in the front side, the rear side, and both right and left sides of the second pressed portion 12 when viewed from the back surface of the seat. Such a facilitating part 40 formed along the entire boundary BP can appropriately facilitate the second pressed portion 12 to be bent and deformed to the second pad 20.

With reference to FIG. 4, the facilitating part 40 is intermittently provided also in the third pressed portion 13 of the seat cushion 4b similarly with the first pressed portion 11. The facilitating part 40 is continuously formed also in the fourth pressed portion 14 similarly with the second pressed portion 12. The facilitating part 40 which has a slightly long linear shape is intermittently provided also in the front side, the rear side, and both right and left sides of the fifth pressed portion 15 of the seat cushion 4c when viewed from the back surface of the seat. In this embodiment, the first pad 10 is partially exposed from the cutout groove parts 26 and 27 of the second pad 20, and the facilitating part 40 is intermittently formed along the cutout groove parts 26 and 27 also in the exposed first pad 10.

In this embodiment, for example, the first pad 10 made of polyurethane foam can be molded by foaming the molding material (typically liquid resin) in the mold cavity (not illustrated). At this time, the second pad 20 is disposed in advance at a proper place in the cavity so that the first pad 10 can be integrated with the second pad 20 simultaneously with the molding thereof. In this embodiment, the integrating part 30 and the facilitating part 40 can be formed simultaneously with the molding of the first pad 10. That is, when the pressed portions 11 to 15 are molded, the molding material is cured while being contacted with each inner surface of the insertion holes 21 to 25, and thus the integrating part 30 is formed simultaneously with the molding of the pressed portions 11 to 15. The integrating part 30 is provided over the entire circumference of each of the pressed portions 11 to 15 when viewed from the back surface of the seat. In the forming of the facilitating part 40, a flat-plate protruding part which conforms to the outer shape of the facilitating part 40 is provided in the cavity, and the protruding part is disposed on the each inner side of the insertion holes 21 to 25 of the second pad 20. The pressed portions 11 to 15 are molded in the state, and thus the facilitating part 40 having a shape conforming to the protruding part can be disposed along the boundary BP while being formed.

With reference to FIGS. 6 and 7, for example, in the seat cushion (the seat cushion 4a in the same drawing), the seat pad 4P is disposed on a seat frame 4F (not illustrated), and is covered with the seat cover 4S. When the occupant is seated, the first pad 10 elastically supports the occupant in the state of being supported by the second pad 20 from below. At this time, the pressed portions 11 to 15 illustrated in FIG. 4 are not supported by the second pad 20 from below, and are strongly pressed by the buttocks of the occupant to be largely bent and deformed relatively downward. Each of the pressed portions 11 to 15 is adjacent to the second pad 20 only in the longitudinal and lateral directions orthogonal to the pressing direction and is integrated with the second pad 20 by the integrating part 30. With such a configuration, there is a concern that the bending and deformation of the pressed portions 11 to 15 of the first pad 10 which is relatively easy to bend and deform is inhibited by the second pad 20. That is, there is a concern that when the pressed portions 11 to 15 are largely bent and deformed, a portion integrated with the second pad 20 cannot sufficiently follow the bending and deformation does not occur.

In this regard, in this embodiment, with reference to FIG. 4, each of the pressed portions 11 to 15 of the first pad 10 includes the facilitating part 40 as groove-shaped portion. The groove-shaped facilitating part 40 is intermittently or continuously disposed along the boundary BP with the second pad 20, and is disposed in a position further away from the boundary BP than the integrating part 30. The pressed portions 11 to 15 to be bent and deformed are disposed away from the second pad 20 and the integrating part 30 by the facilitating parts 40. For this reason, the facilitating part 40 prevents the pressed portions 11 to 15 from being considerably affected by the second pad 20 and the integrating part 30, and thus the pressed portions 11 to 15 can be smoothly bent and deformed. In this manner, in this embodiment, the pressed portions 11 to 15 are bent and deformed as expected so as to improve the seating performance. The occupant sufficiently sinks into the seat cushions 4a to 4c so that the hip point of the occupant is positioned in the vicinity of a designed value (in an allowable range).

As described above, in this embodiment, the pressed portions 11 to 15 can be facilitated to be bent and deformed to the second pad 20 by the facilitating part 40 formed of the first pad 10 itself. In this embodiment, the facilitating part 40 is provided in the pressed portions 11 to 15 of the first pad 10 which is relatively easy to bend and deform, and thus the pressed portions 11 to 15 can be reliably facilitated to be bent and deformed to the second pad 20. In this embodiment, the facilitating part 40 is disposed along the boundary BP where the pressed portions 11 to 15 are easily affected by the second pad 20. The groove-shaped facilitating part 40 separates the pressed portions 11 to 15 to be bent and deformed from the second pad 20 so that the pressed portions 11 to 15 can be appropriately facilitated to be bent and deformed to the second pad 20. In this embodiment, the facilitating part 40 formed along the entire boundary BP can appropriately facilitate the second pressed portion 12 and the fourth pressed portion 14 to be bent and deformed to the second pad 20. In this embodiment, the pressed portions 11 to 15 are stably disposed to be integrated with the second pad 20 through the integrating part 30, and the pressed portions 11 to 15 can be facilitated to be bent and deformed to the second pad 20 by the facilitating part 40.

In this embodiment, the second pad 20, which is relatively hard to bend and deform, can support the first pad 10 from below so as to contribute to the improvement in the seating performance of the vehicle seat 2. In this embodiment, the first pad 10 and the second pad 20 can be stably integrated by a simple method of integral molding. For this reason, in this embodiment, the first pad 10 which is relatively easy to bend and deform can be integrated with the second pad 20 which does not considerably inhibit the bending and deformation of the first pad 10 and is relatively hard to bend.

Herein, various types of configurations are obtained from the configuration of the facilitating part as well as the above-described configuration. For example, with reference to FIG. 9, in the seat pad 4P of a first modification, the facilitating part 40 is continuously formed in the front side, the rear side, and both right and left sides of the first pressed portion 11. In such a modification, the facilitating part 40 formed along the entire boundary BP can appropriately facilitate the first pressed portion 11 to be bent and deformed to the second pad 20. The facilitating part 40 can be continuously formed also in the third pressed portion 13 and the fifth pressed portion 15 similarly with the first pressed portion 11.

The pad of this embodiment is not limited to the above-described embodiment, and other types of embodiments are obtained therefrom. In this embodiment, the configuration (shape, dimension, forming position, and the like) of the pressed portions 11 to 15 is exemplarily illustrated without limiting the configuration of the same portion. For example, the pressed portion may be singly provided or in plurality in the proper position of the first pad, and is preferably provided in a position at which the occupant can face when being seated. In this embodiment, the description has given about an example in which the pressed portion is disposed to be adjacent to the second pad only in a direction orthogonal to the pressing direction. For example, the pressed portion is adjacent to the second pad in the longitudinal and lateral directions when viewed from the back surface of the seat, but may be adjacent to the second pad in at least one direction of front and rear and right and left sides. The pressed portion may be disposed to be adjacent to the second pad in both direction of the direction orthogonal to the pressing direction and the pressing direction. That is, in this embodiment, the second pad which is relatively thinner and is easy to bend properly may be disposed on the back surface of the pressed portion.

In this embodiment, the configuration (shape, dimension, forming position, forming number, and the like) of the facilitating part 40 is exemplarily illustrated without limiting the configuration of the same part. For example, the facilitating part can be formed in at least one of the first pad and the second pad. The facilitating part may be configured in a dot-shaped hole part or a cutout shaped slit as well as a linear or curved groove part. The facilitating part may be formed in a lattice shape when viewed from the back surface of the pressed portion as well as the facilitating part is provided along the boundary with the second pad. In such a case, the lattice-shaped facilitating part may be disposed in the boundary, and may be provided on the second pad across the boundary. The facilitating part may be formed simultaneously with the molding of the pad, and may be formed after the molding. In this embodiment, the description has been given about the example in which the facilitating part is provided on the front side, the rear side, and both right and left sides of the first pressed portion. Unlike that, the facilitating part may be provided on at least one side of the front side, the rear side, and both right and left sides. For example, the facilitating part may be configured to be provided only on the rear side and both right and left sides not on the front side.

In this embodiment, the description has been given about the example in which the integrating part is provided in each of the pressed portions 11 to 15. The integrating part may be formed in such a manner that the first pad and the second pad are separately molded, and are subject to processing such as bonding, fusion, and adhering. The pressed portion may be disposed to be adjacent to the second pad not through the integrating part. In such a case, only the normal portion of the first pad and the second pad are integrated.

In this embodiment, the description has been given about an example of the dedicated seat cushion. However, the configuration of this embodiment may be applied to members having various seat configurations such as the seat back and the headrest. The configuration of this embodiment may be applied to a general seat pad of the vehicle such as a vehicle, an air vehicle, and a train, and may be applied to a general seat pad for office, home, and the like.

As described with reference to the embodiment, according to a first aspect of the present disclosure, there is provided a pad including a first pad which is elastically bendable and deformable by pressure and a second pad which is hard to bend compared to the first pad, and the first pad and the second pad are integrally formed. A pressed portion, which is at least a portion of the first pad, is disposed to be adjacent to the second pad in a direction orthogonal to a pressing direction. With such a configuration, the pressed portion of the first pad which is relatively easy to bend and deform is preferably integrated with the second pad which does not considerably inhibit the bending and deformation of the pressed portion and is relatively hard to bend. According to this aspect of the present disclosure, at least one pad of the first pad and the second pad includes a facilitating part which facilitates the pressed portion to be bent and deformed to the second pad, and the facilitating part is formed of the one pad itself. According to this aspect of the present disclosure, the facilitating part formed of the one pad itself can facilitate the pressed portion to be bent and deformed to the second pad.

In a second aspect of the present disclosure according to the pad of the first aspect, the facilitating part is formed in the pressed portion of the first pad. According to this aspect of the present disclosure, the facilitating part is provided in the pressed portion of the first pad which is relatively easy to bend and deform, and thus the pressed portion can be more reliably facilitated to be bent and deformed to the second pad.

In a third aspect of the present disclosure according to the pad of the first or second aspect, the facilitating part is a groove-shaped portion which is concave in a thickness direction of the one pad, and is disposed along at least a portion of a boundary between the pressed portion and the second pad. According to this aspect of the present disclosure, the facilitating part is disposed along the boundary where the pressed portion is easily affected by the second pad. The groove-shaped facilitating part separates the pressed portion to be bent and deformed from the second pad so that the pressed portion can be appropriately facilitated to be bent and deformed to the second pad.

In a fourth aspect of the present disclosure according to the pad of the third aspect, with a surface orthogonal to the pressing direction set as a reference, the second pad is disposed around the pressed portion, and the facilitating part is formed along the entire boundary. According to this aspect of the present disclosure, the facilitating part formed along the entire boundary can appropriately facilitate the pressed portion to be bent and deformed to the second pad.

In a fifth aspect of the present disclosure according to the pad of any one of the first to fourth aspects, the pressed portion includes an integrating part which is integrated with the second pad in the boundary with the second pad, and the facilitating part is disposed in a position further away from the boundary than the integrating part. According to this aspect of the present disclosure, the pressed portion is stably disposed by being integrated with the second pad through the integrating part, and the pressed portion can be facilitated to be bent and deformed to the second pad by the facilitating part provided in a position away from the boundary and the integrating part.

In a sixth aspect of the present disclosure according to the pad of any one of the first to fifth aspects, the pad is a seat pad of a vehicle seat, the first pad is disposed on a seating surface of the seat, and the second pad is disposed on a back surface, which is opposite to the seating surface, of the seat. According to this aspect of the present disclosure, the second pad, which is relatively hard to bend and deform, can support the first pad from below so as to contribute to the improvement in seating performance of the vehicle seat.

In a seventh aspect of the present disclosure according to the pad of the sixth aspect, the pad is an integrally molded article of the first pad and the second pad. According to this aspect of the present disclosure, the first pad and the second pad are stably provided by being integrated by a simple method of integral molding.

According to the first aspect of the present disclosure, the pad which is relatively easy to bend and deform can be integrated with the pad which does not considerably inhibit the bending and deformation and is relatively hard to bend. According to the second aspect, the pad which is relatively easy to bend and deform can be integrated with the pad which more reliably prevents the inhibition of the bending and deformation and is relatively hard to bend. According to the third aspect, the pad which is relatively easy to bend and deform can be integrated with the pad which further reliably prevents the inhibition of the bending and deformation and is relatively hard to bend. According to the fourth aspect, the pad which is relatively easy to bend and deform can be integrated with the pad which almost reliably prevents the inhibition of the bending and deformation and is relatively hard to bend. According to the fifth aspect, the pad which is relatively easy to bend and deform can be stably integrated with the pad which does not considerably inhibit the bending and deformation and is relatively hard to bend. According to the sixth aspect, the pad which contributes to the improvement in the seating performance of the vehicle seat and is relatively easy to bend and deform can be well integrated with the pad which does not considerably inhibit the bending and deformation and is relatively hard to bend. According to the seventh aspect, the pad which is relatively easy to bend and deform can be further well integrated with the pad which does not considerably inhibit the bending and deformation and is relatively hard to bend.

What is claimed is:

1. A pad comprising:
    a first pad which is elastically bendable and deformable by pressure, the first pad including a pressed portion on which a pressing force is applied; and
    a second pad which is harder to bend compared to the first pad,
    wherein the first pad and the second pad are integrally formed,
    wherein the pressed portion is disposed to be adjacent to the second pad in a direction orthogonal to a pressing direction of the pressing force, and
    wherein at least one pad of the first pad and the second pad includes a facilitating part which facilitates the pressed portion to be bent and deformed with respect to the second pad, and the facilitating part is formed of the one pad itself.

2. The pad according to claim 1,
    wherein the facilitating part is disposed at a position at which the pressed portion of the first pad is disposed.
3. The pad according to claim 1,
    wherein the facilitating part is a groove-shaped portion which is concave in a thickness direction of the one pad, and is disposed along at least a portion of a boundary between the pressed portion and the second pad.
4. The pad according to claim 3,
    wherein the second pad is disposed around the pressed portion with respect to a surface orthogonal to the pressing direction set as a reference.
5. The pad according to claim 4,
    wherein the facilitating part is formed along the entire boundary.
6. The pad according to claim 1,
    wherein the pressed portion includes an integrating part which is integrated with the second pad in the boundary with the second pad, and the facilitating part is disposed in a position further away from the boundary than the integrating part.
7. The pad according to claim 1,
    wherein the pad is a seat pad of a vehicle seat,
    wherein the first pad is disposed on a seating surface side of the vehicle seat, and
    wherein the second pad is disposed on a back surface side, which is opposite to the seating surface, of the vehicle seat.
8. The pad according to claim 7,
    wherein the first pad and the second pad are integrated into one piece by being formed with integral molding.
9. The pad according to claim 1,
    wherein the facilitating part has an opening that faces away from the pressing direction of the pressing force.
10. The pad according to claim 1,
    wherein the facilitating part is wholly formed in the first pad.

* * * * *